US011173878B2

(12) United States Patent
Patel et al.

(10) Patent No.: US 11,173,878 B2
(45) Date of Patent: Nov. 16, 2021

(54) METHOD FOR OPERATING A DUAL SWEEP ANGLE AND INDEXABLE WIPER SYSTEM

(71) Applicant: ROSEMOUNT AEROSPACE INC., Burnsville, MN (US)

(72) Inventors: Amar Patel, Bangalore (IN); Ramanathan Malaichamy, Tamilnadu (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 158 days.

(21) Appl. No.: 16/383,814

(22) Filed: Apr. 15, 2019

(65) Prior Publication Data
US 2019/0241157 A1 Aug. 8, 2019

Related U.S. Application Data

(62) Division of application No. 15/405,592, filed on Jan. 13, 2017, now Pat. No. 10,300,891.

(30) Foreign Application Priority Data

Oct. 26, 2016 (IN) .............................. 201641036696

(51) Int. Cl.
| B60S 1/26 | (2006.01) |
| B60S 1/22 | (2006.01) |
| B60S 1/24 | (2006.01) |
| B60S 1/34 | (2006.01) |
| B60S 1/06 | (2006.01) |
| B64C 1/14 | (2006.01) |

(Continued)

(52) U.S. Cl.
CPC . *B60S 1/26* (2013.01); *B60S 1/22* (2013.01); *B60S 1/24* (2013.01); *B60S 1/3495* (2013.01); *B60S 1/06* (2013.01); *B60S 1/0896* (2013.01); *B60S 1/166* (2013.01); *B64C 1/14* (2013.01); *Y10T 74/18056* (2015.01)

(58) Field of Classification Search
CPC ...... B60S 1/06; B60S 1/16; B60S 1/22; B60S 1/26; B60S 1/166; B60S 1/24; B60S 1/3495; B60S 1/0452; B60S 1/163; B60S 1/0896; Y10T 74/18056; B64C 1/14
USPC .............................. 15/250.13, 250.3, 250.16
See application file for complete search history.

(56) References Cited

U.S. PATENT DOCUMENTS 3,158,890 A 12/1964 Anderson
4,791,698 A 12/1988 Murata
(Continued)

*Primary Examiner* — Gary K. Graham
(74) *Attorney, Agent, or Firm* — Cantor Colburn LLP

(57) ABSTRACT

A windshield wiper assembly for a dual sweep angle and indexable wiper system is provided. The system includes a wiper motor and a wiper arm for sweeping a surface of a windshield coupled to a first eccentric, the first eccentric comprising a primary eccentric and an indexable eccentric plate, wherein the indexable eccentric plate determines an eccentric offset of the wiper arm coupled to the first eccentric. The system further includes an output wiper shaft coupled to the wiper arm, a second eccentric coupled to a cam shaft, and a link coupled to the first eccentric and the second eccentric, the link having a first effective link arm length between the first eccentric and the second eccentric for driving the first eccentric to operate the wiper arm when operated in a first direction.

15 Claims, 5 Drawing Sheets

(51) Int. Cl.
*B60S 1/16* (2006.01)
*B60S 1/08* (2006.01)

(56) References Cited

U.S. PATENT DOCUMENTS

| | | | | |
|---|---|---|---|---|
| 5,166,587 A | * | 11/1992 | Smart | B60S 1/0896 |
| | | | | 318/444 |
| 5,690,207 A | | 11/1997 | Scherch | |
| 6,131,474 A | | 10/2000 | Powell, Jr. | |
| 2004/0205923 A1 | | 10/2004 | Hultquist | |
| 2017/0174183 A1 | * | 6/2017 | Srivatsa | B08B 1/001 |

* cited by examiner

METHOD FOR OPERATING A DUAL SWEEP ANGLE AND INDEXABLE WIPER SYSTEM

CROSS-REFERENCE TO RELATED APPLICATIONS

This application claims the benefit of U.S. application Ser. No. 15/405,592 filed Jan. 13, 2017, now U.S. Pat. No. 10,300,891, and claims priority to India Application No. 201641036696, filed Oct. 26, 2016, and all the benefits accruing therefrom under 35 U.S.C. § 119, the contents of which in their entirety are herein incorporated by reference.

BACKGROUND

Embodiments of the disclosure pertain to the art of windshield wiper systems, and in particular, a dual sweep angle and indexable windshield wiper system.

Windshield wipers are used in a range of vehicles including automobiles, ships, spacecrafts, and aircrafts. In today's environment, wipers are used to increase the visibility and safety when conditions and precipitation obstruct a vehicle operator's view. Generally wipers have a fixed range for sweeping across the window of the vehicle. The fixed range of motion limits the compatibility with different types of vehicles having different size windows. Some vehicles may require a larger sweep angle while others require a smaller sweep angle. Some vehicles may have large windows while others are equipped with small windows.

BRIEF DESCRIPTION

Disclosed is a system for a dual sweep angle and indexable wiper system. The system includes a wiper motor and a wiper arm for sweeping a surface of a windshield coupled to a first eccentric, the first eccentric comprising a primary eccentric and an indexable eccentric plate, wherein the indexable eccentric plate determines an eccentric offset of the wiper arm coupled to the first eccentric. The system further includes an output wiper shaft coupled to the wiper arm, a second eccentric coupled to a cam shaft, and a link coupled to the first eccentric and the second eccentric, the link having a first effective link arm length between the first eccentric and the second eccentric for driving the first eccentric to operate the wiper arm when operated in a first direction.

Further disclosed is an apparatus for a dual sweep angle and indexable wiper system. The apparatus includes a wiper motor, and a wiper arm for sweeping a surface of a windshield coupled to a first eccentric, the first eccentric comprising a primary eccentric and an indexable eccentric plate, wherein the indexable eccentric plate determines an eccentric offset of the wiper arm coupled to the first eccentric. The apparatus further includes an output wiper shaft coupled to the wiper arm, a second eccentric coupled to a cam shaft, and a link coupled to the first eccentric and the second eccentric, the link having a first effective link arm length between the first eccentric and the second eccentric for driving the first eccentric to operate the wiper arm when operated in a first direction.

Also disclosed is a method for operating a dual sweep angle and indexable wiper system. The method includes operating the wiper system in a first direction, including a first eccentric and a second eccentric, the first and second eccentric being coupled by a link having an effective link arm length, wherein the link is set to a first effective arm length based operating in the first direction, and operating the wiper system in a reverse direction, wherein the link is set to a second effective link arm length based on operating in the reverse direction.

BRIEF DESCRIPTION OF THE DRAWINGS

The following descriptions should not be considered limiting in any way. With reference to the accompanying drawings, like elements are numbered alike.

DETAILED DESCRIPTION

In one or more embodiments, systems, apparatuses, and methods for a dual sweep angle and indexable wiper system are provided. Having a fixed sweep angle may not be suitable for every application. The ability to obtain a variety of sweep angles without the need for custom manufactured parts increases the compatibility of the system with different vehicle and windshield types. A wiper system having a variety of configurations using common parts reduces the assembling complexities for manufactures and costs for customers.

In an embodiment, a mechanical system to adjust the sweep angle on demand is provided. In one or more embodiments, two or more sweep angles can be realized by operating a drive motor of the wiper system in a first direction and reversing the drive motor in a second direction. The direction of the drive motor changes an effective link arm length that affects a wiper sweep angle in accordance with an embodiment.

In addition, the mechanical system enables the configuration of the dual sweep angles by flipping an indexable eccentric. In another embodiment, flipping the indexable eccentric changes an eccentric offset of the wiper and further modifies the sweep angle of the wiper. In one or more embodiments, the indexable eccentric allows the same system to configure the various sweep combinations without any modification to the wiper assembly itself. The modifiable configuration of the system increases the versatility of the wiper system. In a different embodiment, a continuous variable eccentric can also be designed to have a large number of combinations for varying the sweep angle of the wiper system. In one or more embodiments, the sweep angle and speed of the wipers can be varied based on a velocity of a vehicle. In a different embodiment, the sweep angle and speed of the wipers can be independently changed by a control signal from an operator.

A detailed description of one or more embodiments of the disclosed system, apparatus, and method are presented herein by way of exemplification and not limitation with reference to the Figures.

Figure 1:
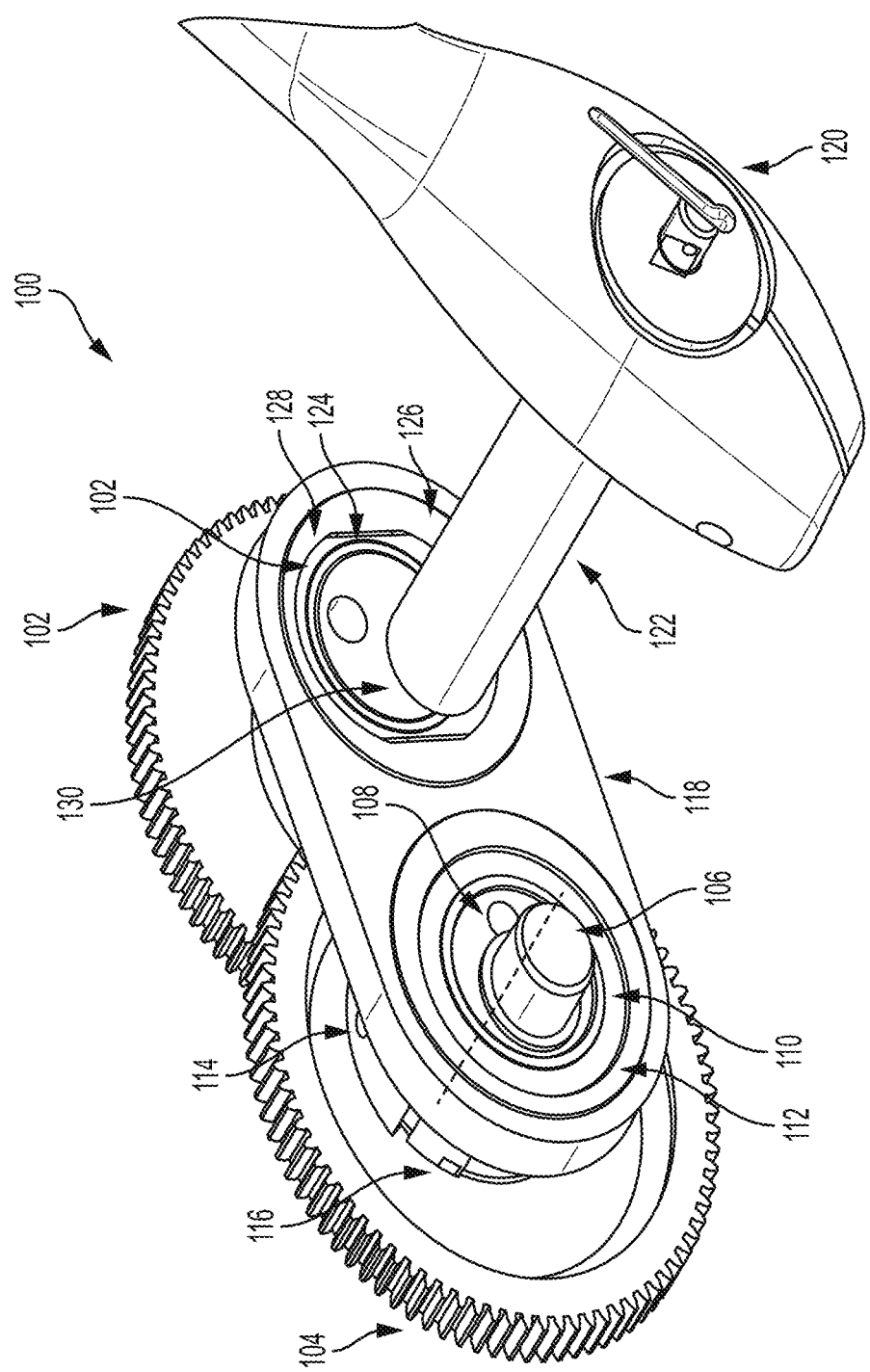
FIG. 1 is a system in accordance with an embodiment for a dual sweep angle and indexable wiper system.

FIG. 1 illustrates a system 100 for a dual sweep angle and indexable wiper system. System 100 includes a drive gear 102 and a driven gear 104. The driven gear 104 is coupled to the cam shaft 106, where the cam shaft 106 is integrated with the cam eccentric 108. Ball bearing 110 is located between the cam eccentric 108 and the secondary eccentric 112. The secondary eccentric 112 includes a secondary eccentric tab 114 that contacts the compression spring 116. The compression spring 116 is capable of maintaining and returning the wiper system 100 to the initial parking position when the motor is reversed. The link 118 transfers the motion to the wiper 120 causing it to oscillate during operation.

FIG. 1 further illustrates the wiper 120 is attached to an output wiper shaft 122 where the output wiper shaft 122 is integrated to an eccentric 130. A bearing 124 is placed between the eccentric 130 and the indexable eccentric plate 126. The indexable eccentric plate 126 is set within the primary eccentric 128. The indexable eccentric plate 126 is reversible within the primary eccentric 128 which changes an eccentric offset of the wiper output shaft 122.

The operation of the wiper system 100 begins when a motor receives a signal and drives the drive gear 102 which is coupled to the driven gear 104. In one or more embodiments, the motor can drive the gears in a forward and reverse direction. In an example, if the motor drives the drive gear 102 in a clockwise direction the driven gear 104 will rotate in the counter-clockwise direction. The driven gear 104 is coupled to the cam shaft 106 which is integrated with the cam eccentric 108. As the driven gear 104 is rotated, the cam shaft 106 and cam eccentric 108 will move together during operation.

During operation, the compression spring 116 rotates in the direction of the driven gear 104. The compression spring 116 rotates from the parking position towards a link stopper located on link 118 (shown in FIG. 3) until contacting the link stopper. The secondary eccentric 112 will become integrated with the cam eccentric 108 and cam shaft 106 fixing the eccentric offset where each of these components will move as one unit. The motion from these components will be transferred to link 118 which will then cause the output wiper shaft 122 to oscillate.

The motion from the link 118 causes a compression spring 316 (shown in FIG. 3) to leave the parking position and rotate towards a link stopper 302 (shown in FIG. 3) on the link 118. In an embodiment, the compression spring 316 in combination with the link tab 302 will fix a position of the primary eccentric 128. In one or more embodiments, the primary eccentric 128 includes an eccentric tab (similar to the secondary eccentric tab 114 of the secondary eccentric 112) and will rotate towards the compression spring 316 to fix the eccentric offset of the primary eccentric 128.

When the cam eccentric 108, the secondary eccentric 112, and the primary eccentric 128 become fixed, an effective link arm length between the cam eccentric 108 and the primary eccentric 128 can be realized. The effective link arm length of link 118 determines the sweep angle range of the output wiper shaft 122 and wiper 120. A change in the effective link arm length will either increase or decrease the sweep angle of the wipers 120. As the link 118 continues to operate, the primary eccentric 128 will transfer the motion to the indexable eccentric plate 102. The bearing 124 and wiper shaft eccentric 130 will then begin to oscillate in response to the transfer of the motion from the link 118. When the motor receives a signal from a control unit to reverse the direction of the rotation of the drive gear 102, the compression springs 116, 316 are returned to the original parking position.

Figure 2:
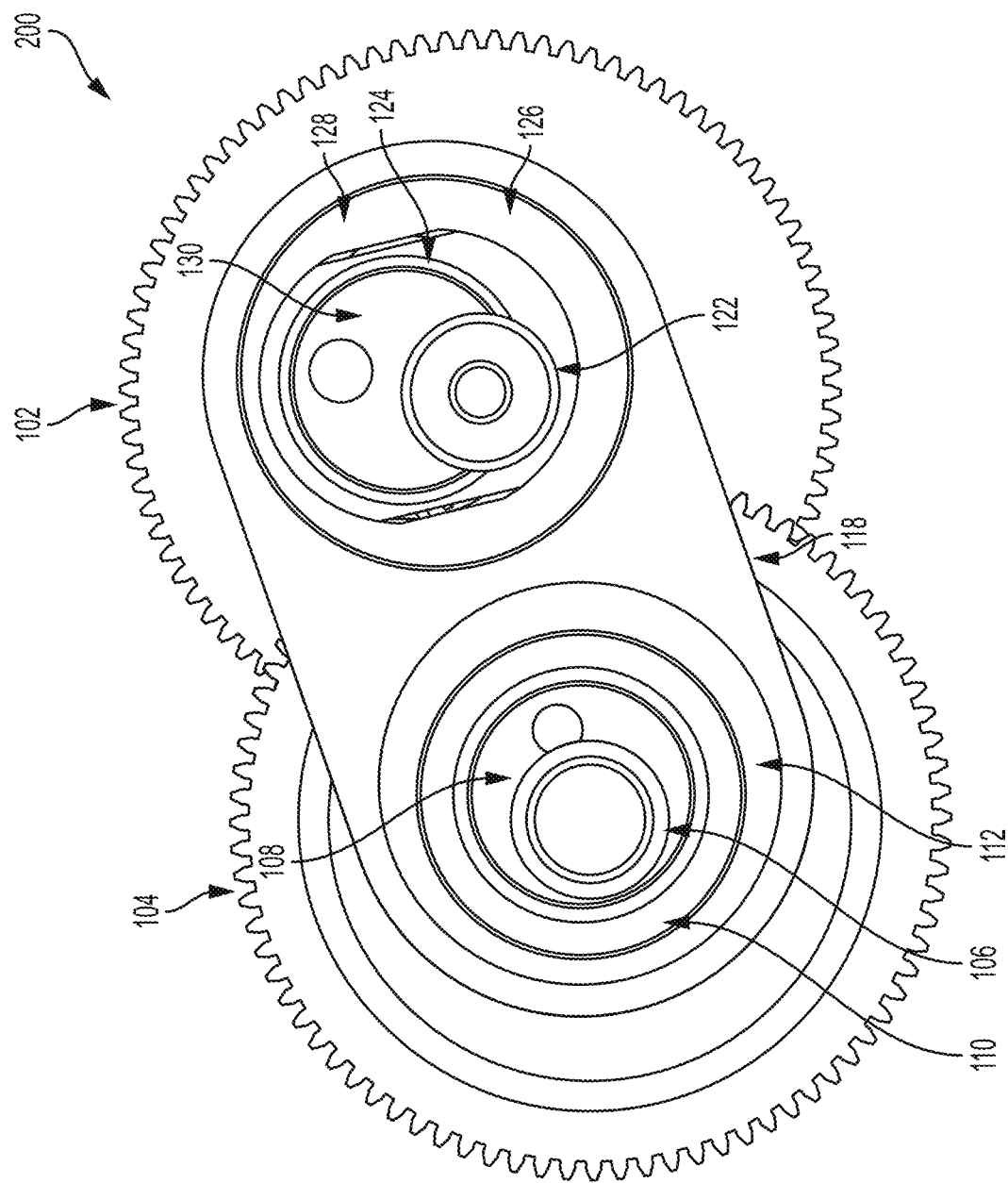
FIG. 2 is a first view of a system for a dual sweep angle and indexable wiper system.
Figure 3:
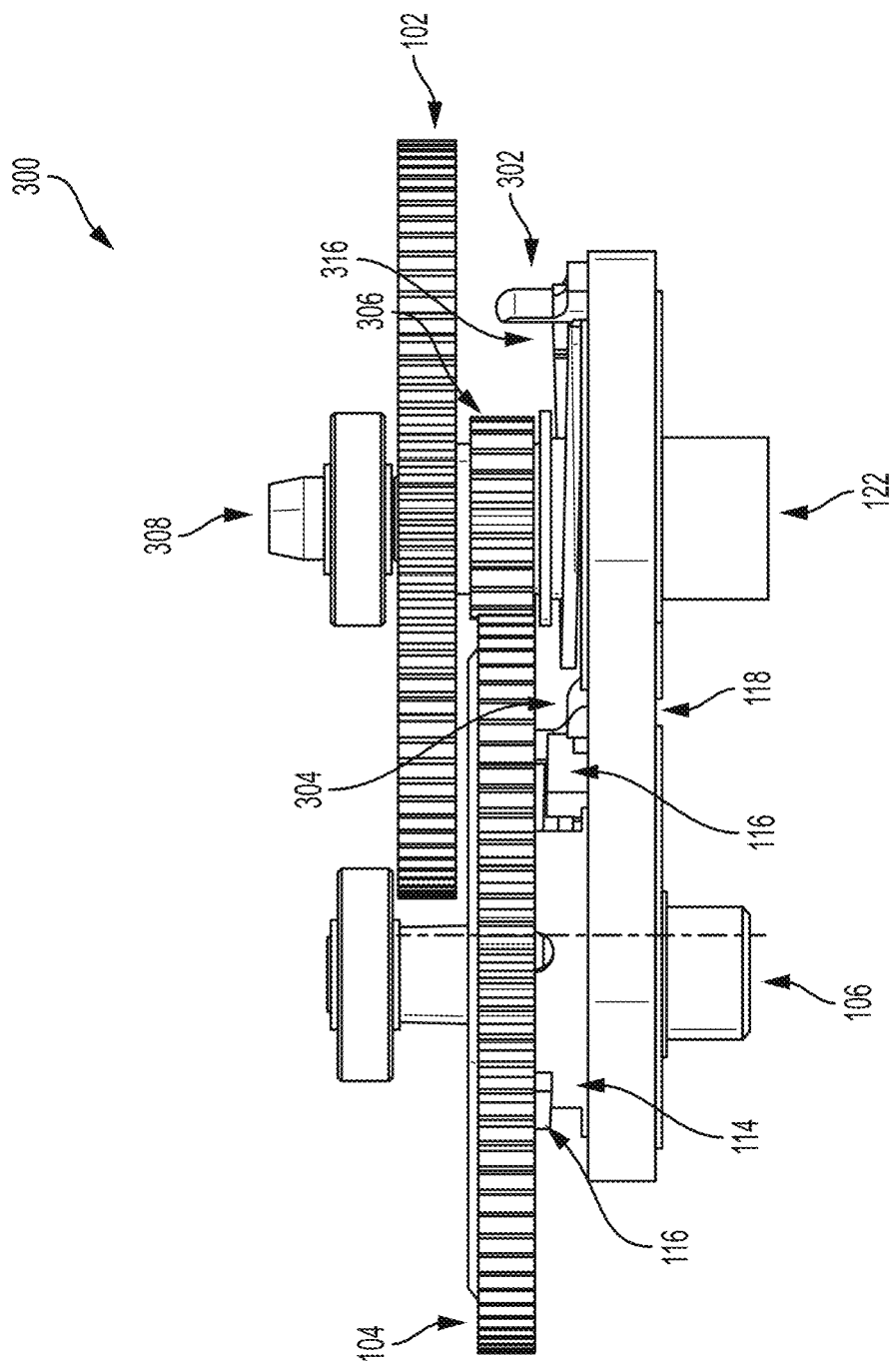
FIG. 3 is a different view of a system for a dual sweep angle and indexable wiper system.

FIG. 2 provides a side view 200 of the dual sweep angle and indexable wiper system 100. The compression spring 116 and secondary eccentric tab 114 are not shown in view 200. FIG. 3 provides a top view 300 of the dual sweep angle and indexable wiper system 100. The top view 300 shows the drive gear 102 which coupled to gear 306 on the motor drive shaft 308, where the gear 306 drives the driven gear 104. The top view 300 also shows an alternate view of the link tabs 302, 304 of the link 118 which stops the rotation of the compression springs 116, 316 during operation to set the position of the eccentrics 112, 128 respectively. In an embodiment, the compression spring 116 includes spring stopper tabs for contacting the link tab 302. The top view 300 also provides an alternative view of the eccentric stopper tab 114 of secondary eccentric 112.

During an operation when the motor drives the wiper system 100 in a first direction, the compression spring 116 will rotate and a first tab of the compression spring 116 will contact the link tab 304 followed by the secondary eccentric 112 setting a first eccentric offset. When the motor is reversed and drives the wiper system 100 in the opposite direction, a second tab of the compression spring 116 will contact the link tab 304 followed by the secondary eccentric 112 setting a second eccentric offset. The first eccentric offset and second eccentric offset will change the effective link arm length that drives the output wiper shaft 122. In an example, the system 100 when operated in a first direction can provide first sweep angle of approximately 23 degrees. Operating the system 100 in a direction opposite the first direction can increase the sweep angle to 70 degrees.

Figure 4:
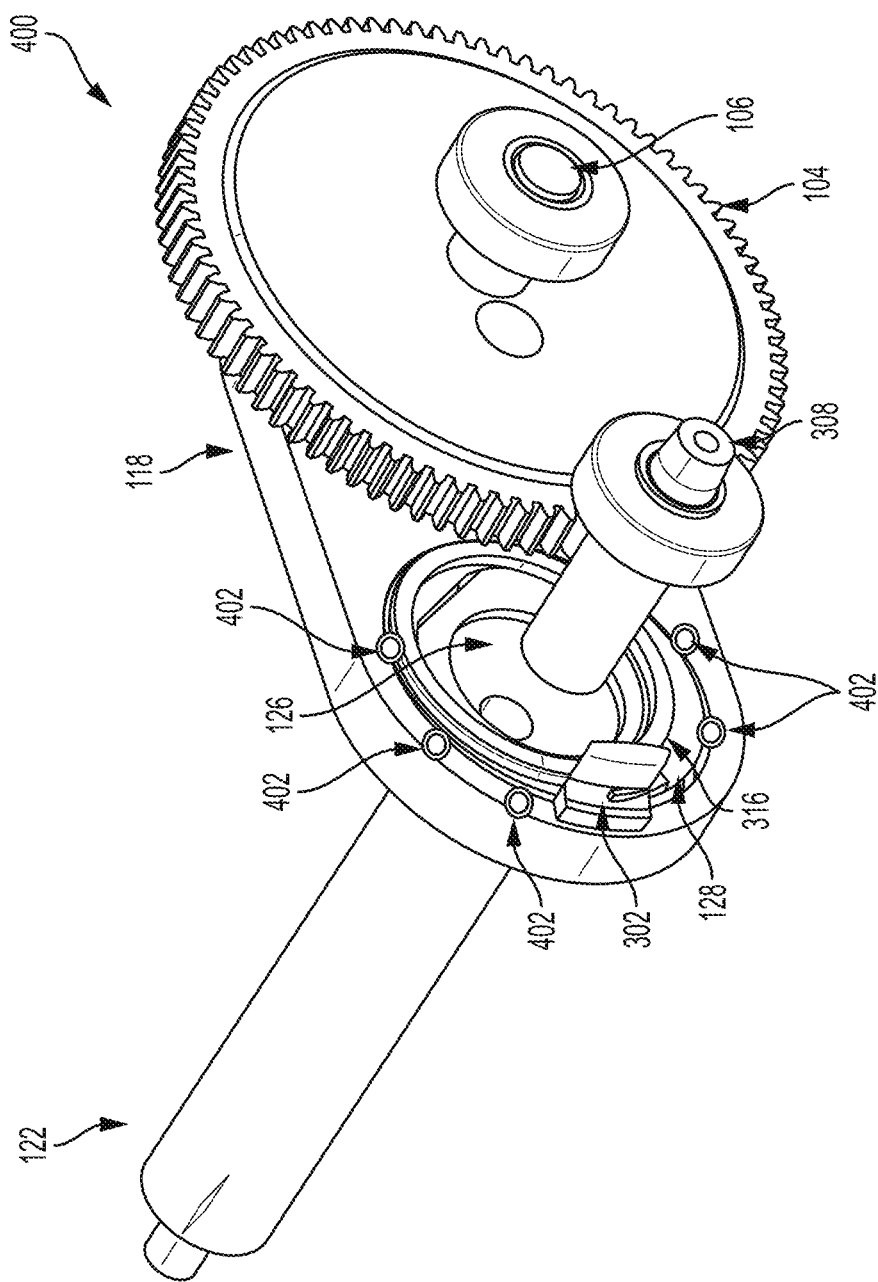
FIG. 4 is different view for a system for a dual sweep angle and indexable wiper system.

FIG. 4 illustrates an alternative view 400 of the wiper system 100. The drive gear 102 and gear 306 (of FIG. 3) are not shown for convenience. The link 118 can be configured with a link tab 302 in a first position. The link tab 302 can be positioned in various positions 402 on the link 118, allowing for multiple eccentric offset combinations. Each eccentric offset combination can provide different sweep angles using the same hardware. In an embodiment, the link tab 302 can be assembled and positioned during manufacturing to meet the needs of a customer.

In one or more embodiments, the primary eccentric 128 can be configured with a stopper tab, similar to the secondary eccentric tab 114 of the secondary eccentric 112. The eccentric stopper tab functions in combination with the link stopper 302 and compression spring 316 to fix the eccentric offset for the output wiper shaft 122. The eccentric offset will vary the sweep angle of the wiper 124 during operation.

Figure 5B:
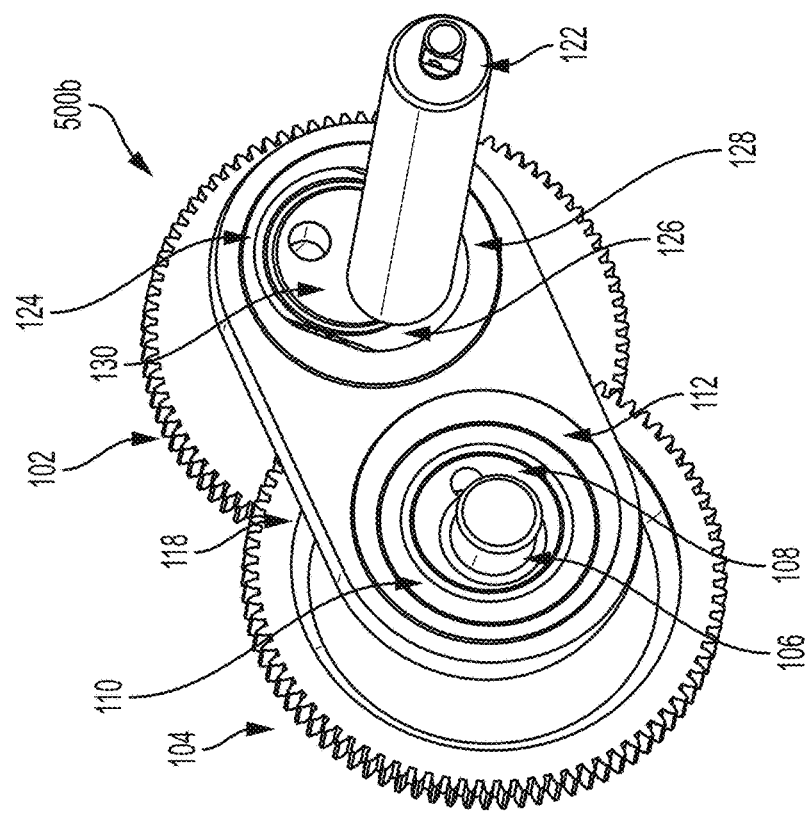
FIGS. 5a and 5b depicts a configuration for a dual sweep angle and indexable wiper system in accordance with an embodiment.
Figure 5A:
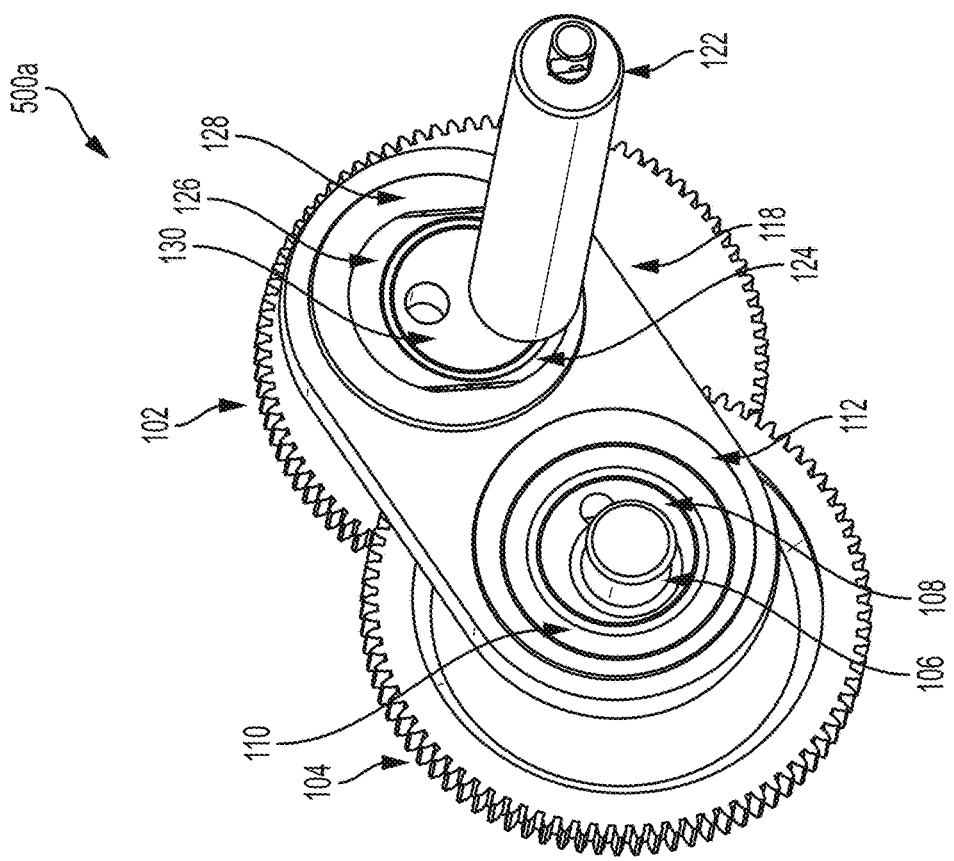

FIG. 5a illustrates a first configuration 500a of a dual sweep angle and a wiper system 100 in accordance with an embodiment. The first configuration 500a depicts the indexable eccentric plate 126 fixed within the primary eccentric 128 wherein the wide portion of the indexable eccentric plate 126 is positioned away from the output wiper shaft 122. In an embodiment, the eccentric offset of the first configuration can be 0.182 inches.

In one or more embodiments, the indexable eccentric plate 126 can be reversed within the primary eccentric 128, wherein the indexable eccentric plate 126 affects the eccentric offset of the output wiper shaft 122 changing the sweep angles of the wiper 120. In another embodiment, the same hardware can be used in the first and second configuration reducing the complexities of manufacturing.

FIG. 5b illustrates a second configuration 500b of a dual sweep angle and a wiper system 100. The second configuration 500b depicts the indexable eccentric plate 126 fixed within the primary eccentric 128 wherein the wide portion of the indexable eccentric plate 126 is positioned closest to the output wiper shaft 122. The indexable eccentric plate 126 of the second configuration is positioned opposite to that of the first configuration. In an embodiment, the eccentric offset of the second configuration can be 0.442 inches.

In one or more embodiments, the sweep angle can be integrated with the vehicle velocity. For example, during a heavy snow or rain a smaller sweep angle is preferred over a larger sweep angle. In addition, while using the smaller sweep angle a faster speed for oscillating the wiper should be utilized. In an embodiment, when the velocity of the aircraft exceeds a configurable threshold, the wiper system will be operated in a direction providing a smaller sweep angle, and the wipers will be operated at a higher speed. A signal can be supplied to reverse the motor to reduce the sweep angle based on the vehicle velocity. In another embodiment, while the vehicle is operated at a velocity less than the configurable threshold, the wiper system will be operated in an opposite direction providing a larger sweep angle, and the wipers will be operated at a slower speed. In one or more embodiments, the speed of the wipers and the direction affecting the sweeping angles can be independently controlled by an operator.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating a dual sweep angle and indexable wiper system, the method comprising:
   operating the wiper system in a first direction, wherein the wiper system comprises: a first eccentric and a second eccentric, wherein the first and the second eccentric being coupled by a link having an effective link arm length, wherein the link is set to a first effective arm length based on operating the wiper system in the first direction, wherein at least one of the first eccentric and the second eccentric is a reversible eccentric, wherein the second eccentric can be flipped to change the eccentric offset of a wiper in the wiper system which modifies the sweep angle of the wiper; and
   operating the wiper system in a reverse direction, wherein the link is set to a second effective link arm length based on operating in the reverse direction.

2. The method of claim 1, wherein operating the wiper system comprises determining a direction and speed to operate the wiper system based on a velocity of a vehicle equipped with the wiper system.

3. The method of claim 2, operating the wiper system comprises, if the velocity of the vehicle exceeds a configurable threshold, operating the wiper system in the first direction at an increased speed,
   otherwise operating the wiper system in the second direction at a reduced speed.

4. The method of claim 3, wherein the first effective link arm length of the first direction has a smaller sweep angle than the second effective link arm length of the second direction.

5. The method of claim 1, further comprising configuring a link tab of the wiper system for different eccentric offset combinations corresponding to different sweep angles for the wiper system.

6. The method of claim 1, further comprising reversing the reversible eccentric to change an eccentric offset combination of the wiper system.

7. The method of claim 1, further comprising parking the wiper system in a parking position when not in operation.

8. The method of claim 7, wherein operating the wiper system in the first direction comprising initiating the wiper system from the park position.

9. The method of claim 7, wherein operating the wiper system in the second direction comprising initiating the wipers from the park position.

10. A method for operating wiper system, the method comprising:
    operating the wiper system in a first direction, wherein the first direction sets a first effective arm length based at least in part on using a reversible eccentric, wherein the second eccentric can be flipped to change the eccentric offset of a wiper in the wiper system which modifies the sweep angle of the wiper in the wiper system; and
    operating the wiper system in a second direction opposite the first direction, wherein the second direction sets a second effective arm length based at least in part on using the reversible eccentric, wherein the first effective arm length is different than the second effective arm length.

11. The method of claim 10, further comprising configuring a link tab of the wiper system for different eccentric offset combinations corresponding to different sweep angles for the wiper system.

12. The method of claim 10, further comprising reversing the reversible eccentric to change an eccentric offset combination of the wiper system.

13. The method of claim 10, further comprising parking the wiper system in a parking position when not in operation.

14. The method of claim 13, wherein operating the wiper system in the first direction comprising initiating the wiper system from the park position.

15. The method of claim 13, wherein operating the wiper system in the second direction comprising initiating the wipers from the park position.

* * * * *